US006346349B1

United States Patent
Briscoe et al.

(10) Patent No.: US 6,346,349 B1
(45) Date of Patent: Feb. 12, 2002

(54) ANODE INVENTION FOR LITHIUM/TRANSITION METAL FLUORIDE MOLTEN SALT CELLS AND BATTERIES

(75) Inventors: James D. Briscoe, Westminster; Gabriel L. Castro, Baltimore; Janet Embrey, Fallston; Robert Staniewicz, Hunt Valley, all of MD (US); Richard A. Marsh, Tipp City, OH (US)

(73) Assignee: Alcatel, Paris (FR)

(*) Notice: Subject to any disclaimer, the term of this patent is extended or adjusted under 35 U.S.C. 154(b) by 0 days.

(21) Appl. No.: 09/503,154

(22) Filed: Feb. 11, 2000

Related U.S. Application Data

(60) Provisional application No. 60/119,799, filed on Feb. 11, 1999.

(51) Int. Cl.[7] ............................................... H01M 4/58
(52) U.S. Cl. .............................. 429/231.95; 429/231.9; 429/199; 429/231.1
(58) Field of Search ......................... 429/231.9, 231.95, 429/220, 219, 221, 218.1, 199, 207, 188, 231.7, 231.1

(56) References Cited

U.S. PATENT DOCUMENTS

| | | | | |
|---|---|---|---|---|
| 3,972,729 A | * | 8/1976 | Mosetti et al. ................. | 136/75 |
| 5,035,963 A | * | 7/1991 | Plichta et al. ................. | 429/103 |
| H1397 H | * | 1/1995 | Plichta et al. ................. | 429/122 |
| H1544 H | | 6/1996 | Miles | |
| 5,658,689 A | | 8/1997 | Kawakami et al. | |
| 5,756,230 A | | 5/1998 | Gao et al. | |
| 5,932,375 A | * | 8/1999 | Tarcy et al. ............ | 429/231.95 |

FOREIGN PATENT DOCUMENTS

JP 73015063 * 9/1967

OTHER PUBLICATIONS

Thermal Battery for Space Based Interceptor Rocket, by Janet M. Embrey and Mary Elizabeth Bolster, Final Report for Period Oct. 1987–Dec. 1989, Feb. 1991.

Fluoride Based Cathodes and Electrolytes for High Energy Thermal Batteries, by J. Douglass Briscoe, IECEC–98–172, $33^{rd}$ Intersociety Engineering Conference on Energy Conversion, Aug. 2–6, 1998.

Lithium High Energy Batteries, by J. B. Mathur & R.G. Ayyar, Journal of Scientific and Industrial Research 35#8 (Aug. 1976).

Session on High Energy Cathode Materials; Metal Fluoride Compounds as Cathods for Thermal Batteries, by Charles B. Root and Raymand A. Sutula, $22^{nd}$ Power Source 1968 No month available.

Investigation of Lithium Intercalation Metal Oxides for Thermal Batteries, by Bolster and Staniewicz, 90CH2863–9/90/0000–0136$01.00 1990 IEEE. No month available (NMA).

Thermal Battery Based on a New, High Volage Cathodic Material, by de Guibert and Buchel, 90 CH2863–9/90/00000–0145$01.00 1990 IEEE. No month available (NMA).

* cited by examiner

Primary Examiner—Stephen Kalafut
Assistant Examiner—R. Alejandro
(74) Attorney, Agent, or Firm—Sughrue Mion, PLLC

(57) ABSTRACT

A thermal electrochemical cell having a LiAl anode with a salt additive in the range of 10% to 40%, a transition metal fluoride cathode and an alkali metal fluoride salt mixture electrolyte. Preferably, the cathode is $CuF_2$ and the electrolyte is selected from the group consisting of LiF—KF, LiF—KF—NaF, LiF—RbF, LiF—KF—RbF, LiF—NaF—RbF, and LiF—KF—RbF.

8 Claims, 5 Drawing Sheets

ANODE INVENTION FOR LITHIUM/ TRANSITION METAL FLUORIDE MOLTEN SALT CELLS AND BATTERIES

This application claim benefit to provisional No. 60/119,799 filed Feb. 11, 1999.

BACKGROUND OF THE INVENTION

1. Field of the Invention

The present invention is directed to a thermal battery including a transition metal fluoride cathode, a lithium aluminum anode and a fluoride electrolyte where the lithium aluminum anode includes a predetermined amount of salt.

2. Background

Thermally activated electrochemical cells are used extensively in military applications because of their relatively long shelf life and compactness, and their ability to withstand vibration and shock. The electrolyte is solid under normal storage conditions and does not conduct electricity. When the battery and/or electrolyte is heated by, for example, igniting a built-in pyrotechnic heat source, the electrolyte changes to the molten state and becomes conductive to ionically connect the electrodes to provide the desired electromotive force.

Thermal batteries have been used since World War II as primary reserve power sources for ordnance. They have long shelf lives, high reliability, and proven safety. With the advent of lithium/Iron disulfide chemistry in the 1970's, improved energy and power densities were obtained. Today, lithium/Iron disulfide is still the state-of-the-art electrochemistry for thermal batteries. Nevertheless, batteries with higher energy and power densities are desired for advanced weapon systems.

In an effort to improve the energy density of a thermal battery, it is desirable to use transition metal fluoride cathodes as a replacement for the conventional iron disulfide.

$LiAl/CuF_2$ (anode/cathode) cells have produced 227 Wh/kg. This exceeds the specific energy of state-of-the-art cells with iron disulfide by nearly 40%. The copper fluoride cells average 2.44 volts when discharged at a current density of 200 $mA/cm^2$.

A publication entitled "Thermal Battery for a Space Based Interceptor Rocket" authored by J. M. Embrey and M. E. Bolster is directed to work on metal fluorides in the late 1980's. Some of these fluoride systems offer high voltage and high theoretical energy versus lithium in alkali metal fluoride salt electrolytes. Recently, screening tests were performed to determine the best metal fluoride candidates as discussed in a publication entitled "Fluoride Based Cathodes and Electrolytes for High Energy Thermal Batteries". Iron (III) fluoride and silver(II) fluoride cathodes have observed open circuit potentials of 3.65 and 4.59 volts versus lithium in LiF—KF eutectic electrolyte. These metal fluorides have good theoretical capacity and energy. However, they are powerful oxidizing agents so that reaction with cell materials is a problem.

Copper(II) fluoride was the best performing metal fluoride of the screening tests. It has 3.05 volts open circuit and is much less reactive with the cell and battery materials. An object of the invention is to provide an improved thermal electrochemical cell having an improved operating characteristics.

SUMMARY OF THE INVENTION

The present invention is directed to a thermal electrochemical cell having a LiAl anode with a salt additive in the range of 10 wt % to 40 wt %, a transition metal fluoride cathode and an alkali metal fluoride salt mixture electrolyte. Preferably, the cathode is $CuF_2$ and the electrolyte is selected from the group consisting of LiF—KF, LiF—KF—NaF (FLiNaK), LiF—RbF, LiF—KF—RbF, LiF—NaF—RbF, and LiF—KF—RbF.

DETAILED DESCRIPTION OF THE INVENTION

Figure 1:
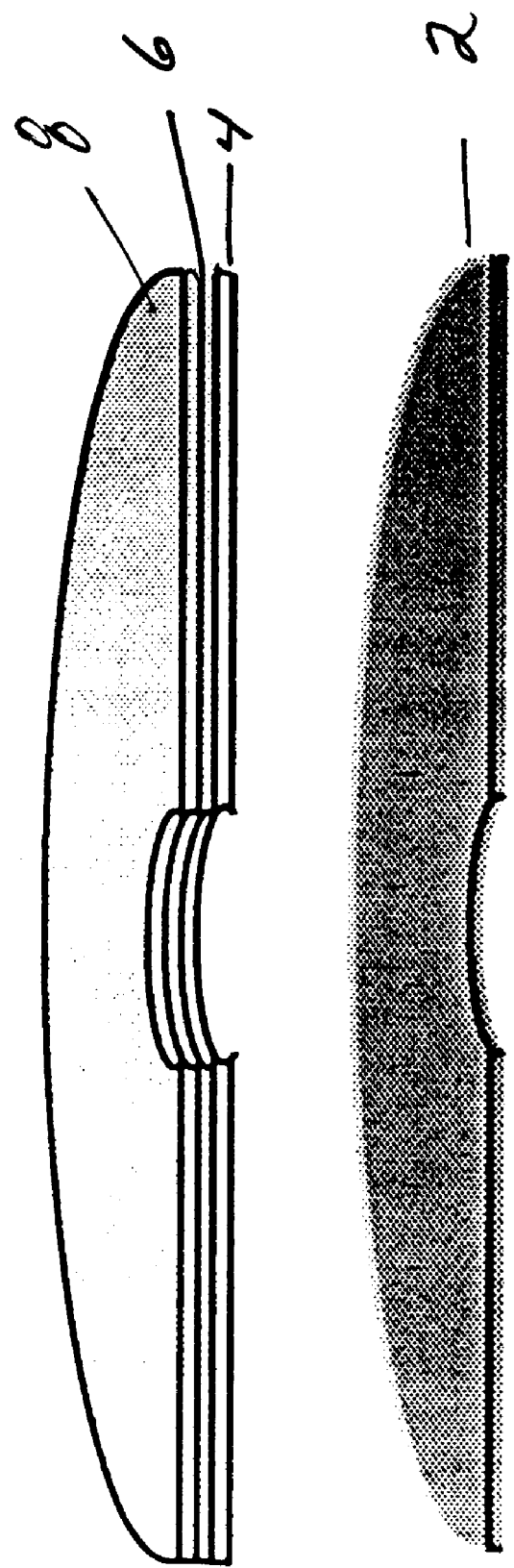
FIG. 1 is a sectional view of a $LiAl/CuF_2$ single cell, according to the present invention.

The electrochemical cell according to the present invention includes a lithium based anode, an alkali metal fluoride molten salt electrolyte and a copper(II) fluoride cathode.

State-of-the-art negative electrodes for lithium thermal batteries consist of either lithium aluminum or lithium silicon, which are solid alloys at operating temperature, or LAN, which is liquid lithium immobilized by a high surface area iron powder. Initial experiments and screening tests were performed with LAN. A few cells were tested with LiSi. However, best results were obtained with LiAl anodes having a salt additive in the range of 10 wt % to 40 wt %, as discussed in greater detail below.

Transition metal fluorides require all fluoride anion molten salt electrolytes because replacement reactions occur with standard alkali metal chlorides and bromides to produce free chlorine or bromine gas. Furthermore, cells with electrolytes that contain LiF will tend to have less concentration gradient effects. These factors limit the choice of electrolytes. A list of electrolytes is shown in Table I.

TABLE 1

Lithium Fluoride Electrolytes [4]

| Salt | Melting Point Degrees | Composition, Mole % |
|---|---|---|
| LiF-KF | 492 | 50-50 |
| LiF-KF-NaF | 454 | 46.5-42-11.5 |
| LiF-RbF | 470 | 44-56 |
| LiF-KF-RbF | 441 | 50-26-24 |
| LiF-NaF-RbF | 437 | 42-48-10 |
| LiF-KF-NaF- | 424 | 45-18-10-27 |

The best cell test results were obtained with LiF—KF and LiF—KF—NaF electrolytes. Though most of the electrolytes with rubidium fluoride have lower melting points, cells with these electrolytes had inferior performance. This is probably due to the large size and relatively low mobility of the Rb ion.

The copper(II) fluoride cathode is prepared by the reaction of copper carbonate and anhydrous hydrogen fluoride to form the monohydrate, $CuF_2.H_2O$. Water is removed by dehydration under an atmosphere of fluorine at 150–300° C. [5].

The reduction of copper(II) fluoride by lithium to form lithium fluoride and copper metal is written as follows.

$$2Li + CuF_2 = 2LiF + Cu \quad (1)$$

A comparison of $FeS_2$ with $CuF_2$ is shown in Table 2. $CuF_2$ has higher voltage, capacity, energy density, and melting point than $FeS_2$. The voltage of cell reaction (1) is calculated as 3.44 volts using equation (2) with $\Delta G$ equal to $-158.738$ kcal at 500° C.

$$\Delta G = -nFE \quad (2)$$

The capacities as calculated in the table include the weight of lithium. Because the theoretical capacity of $CuF_2$ is only about 16% higher than that of $FeS_2$, most of the specific energy gains result from the higher voltage of $CuF_2$.

Generally speaking, transition metal fluorides are poor electronic conductors, and $CuF_2$ is no exception. Thus, much of the experimental work involved investigation of conductive additives along with current collector geometry and materials.

TABLE 2

Comparison of $FeS_2$ with $CuF_2$

|  | $FeS_2$ | $CuF_2$ |
| --- | --- | --- |
| Theoretical voltage vs. Li | 1.98 | 3.44 |
| Theoretical capacity (Ah/g) | 0.401 | 0.464 |
| Theo. specific energy | 794 | 1,597 |
| Density (g/cc) | 5.02 | 4.23 |
| Melting point (degrees C.) | 676 dec. | 836 |
| Cost per kilogram | <$1.00 | ≈$500 |

EXAMPLE

Electrolytes were processed in-house or purchased from Advanced Research Chemicals. Anhydrous fluoride salts were purchased from CERAC, FMC and J. T. Baker for in-house processing. These were vacuum dried, weighed in the proper proportions and fused in an alumina crucible inside an argon atmosphere glove box. The resulting salt mixtures were cooled and ground to −60 US mesh particle size.

The electrolyte and separator formulations were made by blending Marinco OL type magnesia powder with electrolyte powder and fusing at high temperature. These were cooled and ground to −60 US mesh.

$CuF_2$ as obtained from CERAC and Advanced Research Chemicals was blended with electrolyte and various conductive additives to make positive formulations. These were then cold compacted with electrolyte/separator powder onto a copper current collector to make a three-layer disk. Some $CuF_2$ cells contained a positive current collector grid.

LiAl powder was purchased from Chemetall Foote Corp. blended with electrolyte and cold compacted into a separate disk. The LiAl disk and three layer disk were assembled to make a 57.15 mm (2.25") diameter single cell as shown in FIG. 1 including the LiAl anode 2, electrolyte 4, a transition metal fluoride cathode 6 and copper collector 8. Each cell with current collectors and leads was sandwiched between mica sheets and heated between the boron nitride platens of a single cell tester. A pneumatic cylinder applied force during the test. A BITRODE LCN-25-12 tester with computer control and data acquisition supplied electrical loads.

A generic constant current 5 A load with 10 A pulses was used for cell evaluation. Iterative testing was performed to determine the best electrolyte type and loading, current collector material, and conductive additive. Extensive cell testing was done with $CuF_2$ in LiF—KF and LiF—KF—NaF electrolytes.

The best performing cells consisted of a LiAl negative with 20–30 wt % salt, a LiF—KF—NaF electrolyte/separator layer with 30–35 wt % MgO binder and a $CuF_2$ positive containing salt, copper powder, and copper grid on copper foil. Such cells provided up to 230 Wh/kg when tested at 200 mA/cm$^2$.

Figure 2:
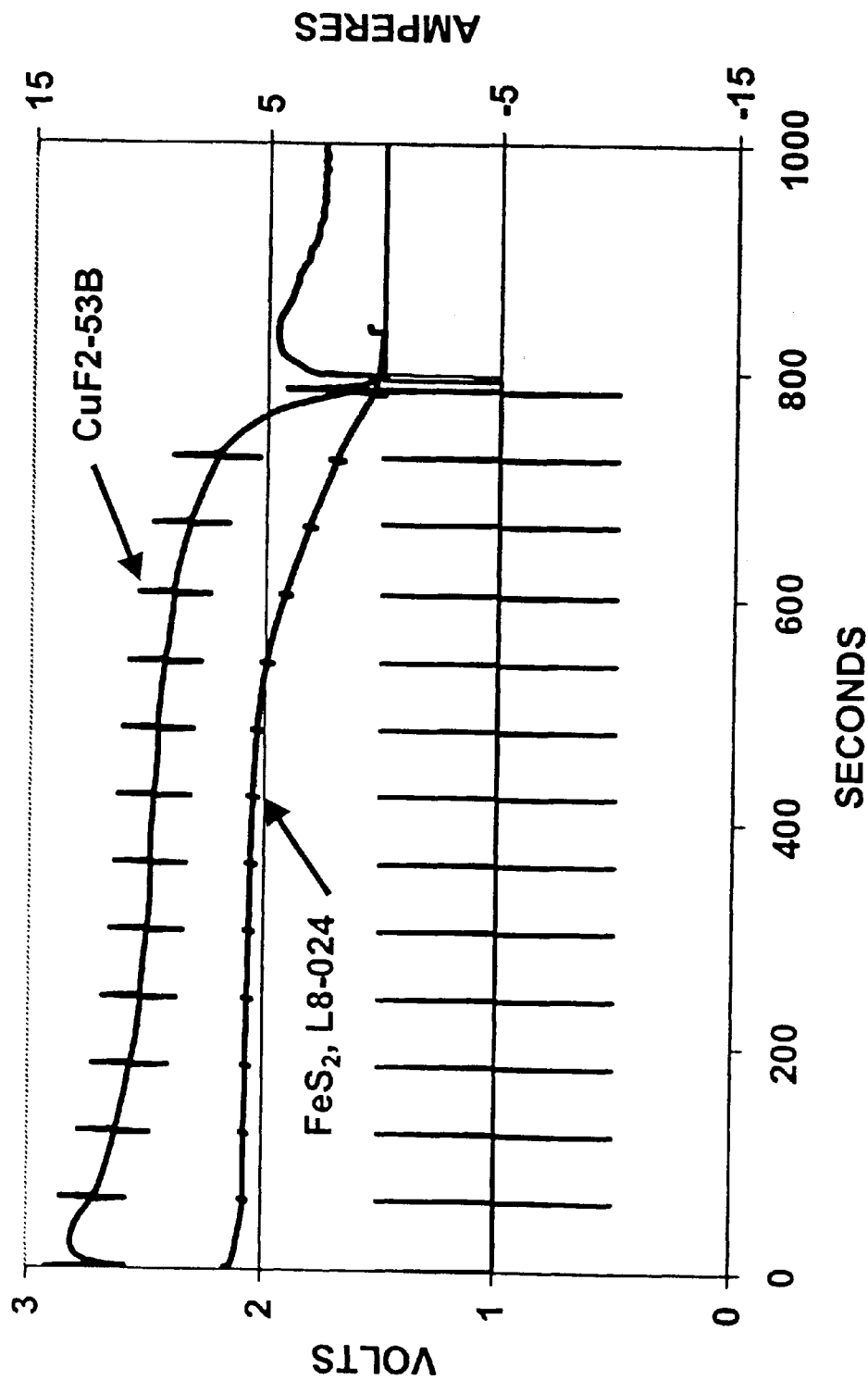
FIG. 2 is a graph comparing a LiAl (with 20% salt)/$CuF_2$ cell with a $FeS_2$ cell.

During the baseline development, LAN/$FeS_2$ cells were optimized for performance. The best cell containing an $FeS_2$ cathode, L8-024, delivered 163 Wh/kg at 200 mA/cm$^2$. A comparison plot of this cell with one of the best $CuF_2$ cathode cells with an LiAl anode with 20% salt, CuF2-53B, is depicted in FIG. 2. The most noticeable differences are the higher steady state voltage of the $CuF_2$ cell and the higher pulse voltage extremes.

The performance data are shown in Table 3. The improvement in specific energy of the $CuF_2$ cell is nearly 40% better than that of the $FeS_2$ cell.

TABLE 3

Best LAN/$FeS_2$ and LiAl/$CuF_2$ Cell Data

|  | $FeS_2$ | CuF2 (20% salt in anode) |
| --- | --- | --- |
| Open circuit voltage | 2.15 | 2.95 |
| Peak voltage @ 200 | 2.13 | 2.58 |
| Average load voltage | 1.95 | 2.44 |
| Capacity (Ah) | 1.15 | 1.11 |
| Energy (Wh) | 2.25 | 2.70 |
| Specific energy (Wh/kg) | 163 | 227 |
| Percent cathode utilization | 56 | 55 |

Because the capacities of the two cells are nearly equal, the improvement in specific energy derives from the higher voltage and lower weight of the $CuF_2$ cell.

A LiAl/LiF—KF—NaF/$CuF_2$ electrochemical cell having a salt additive in the anode has been developed for use in an improved thermal battery. A 25% improvement in voltage and nearly 40% improvement in specific energy have been demonstrated versus baseline $FeS_2$ cell technology. Cells have delivered 227 Wh/kg at an average 2.44 volts at 219 mA/cm$^2$.

It has been discovered that the amount of salt additive to the anode is the key to the utilization of the transition metal fluoride cathode and key to the superior energy attained from the cell. Performance improvements due to replacement of iron disulfide cathode and LiCl—LiBr—LiF electrolyte with a metal fluoride cathode and electrolyte would be thought to be dependent on the composition of that cathode and electrolyte. In fact, however, it is the salt additive to the anode that improves the performance.

Recent experiments with LAN (which has no salt additive) illustrates this point. In many lithium/iron disulfide batteries, LAN and LiAl can be used interchangeably with only minor differences in utilization and energy densities. Good performance with LAN/$CuF_2$ was expected due to its higher potential, better rate capability, and better thermal stability. However, the performance with LAN (which has no salt additive) was very poor. On the other hand, when using an LiAl anode with 10 wt % salt the performance immediately improved. The best composition is between 20–30 wt % salt, although a salt content of 40 wt % is acceptable. Test results are shown in Table 4.

TABLE 4

| Cell | Description | OCV | Sec | Ah | Wh/kg | Anode % Util | Cathode % Util |
|---|---|---|---|---|---|---|---|
| CuF2-70B | 100% Li LAN/ FLiNaK/ $CuF_2$ | 3.06 | 133 | 0.18 | 32 | 12 | 10 |
| CuF2-49A | 90% Li + 10% salt LiAl/ FLiNaK/ $CuF_2$ | 2.96 | 426 | 0.598 | 120 | 32 | 29 |
| CuF2-53B | 80% Li + 20% salt LiAl/ FLiNaK/ $CuF_2$ | 2.92 | 796 | 1.11 | 227 | 60 | 54 |

Figure 3:
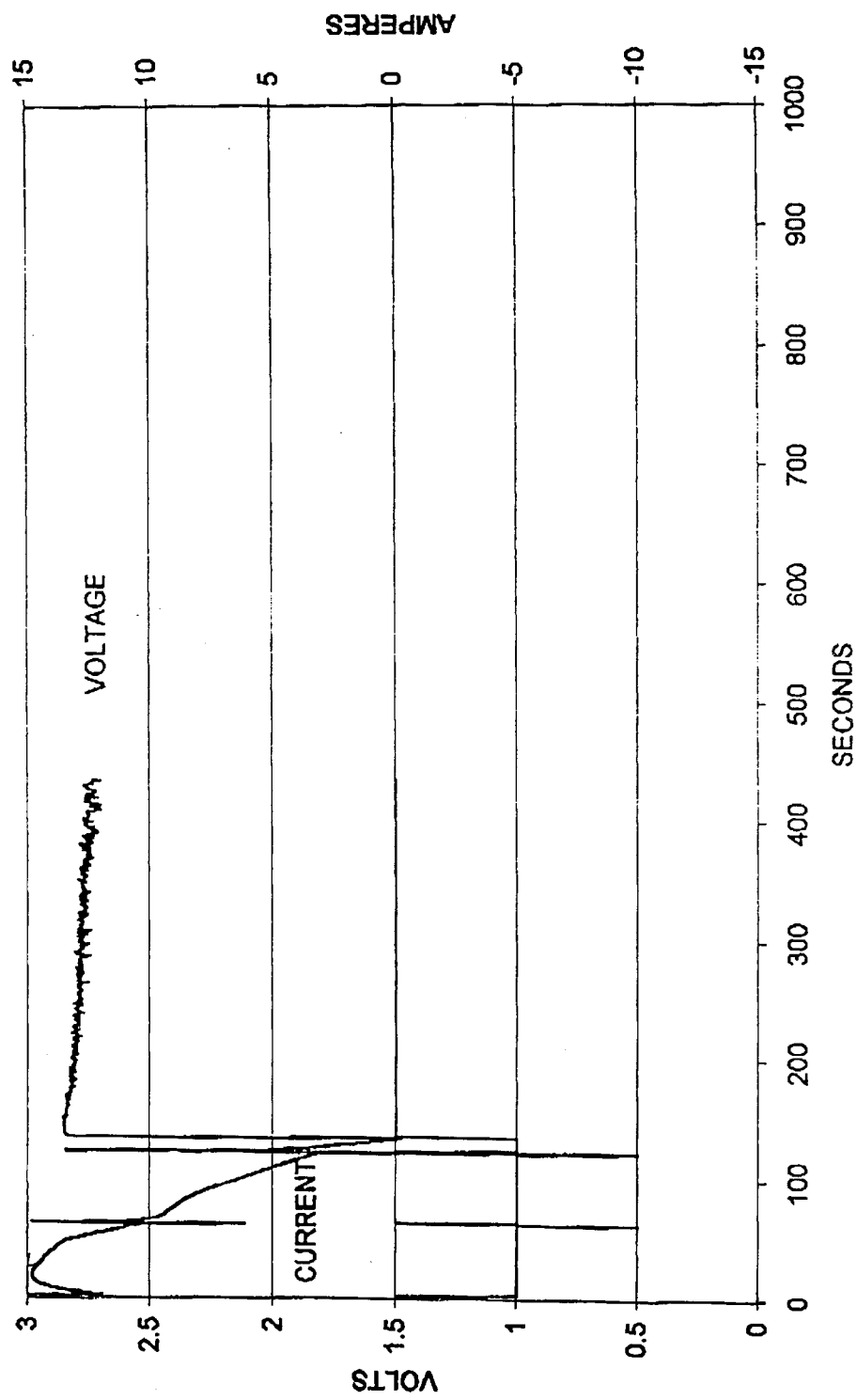
FIG. 3 is a graph showing the characteristics of an LAN/FLiNaK/$CuF_2$ cell with no salt in the LAN anode.
Figure 4:
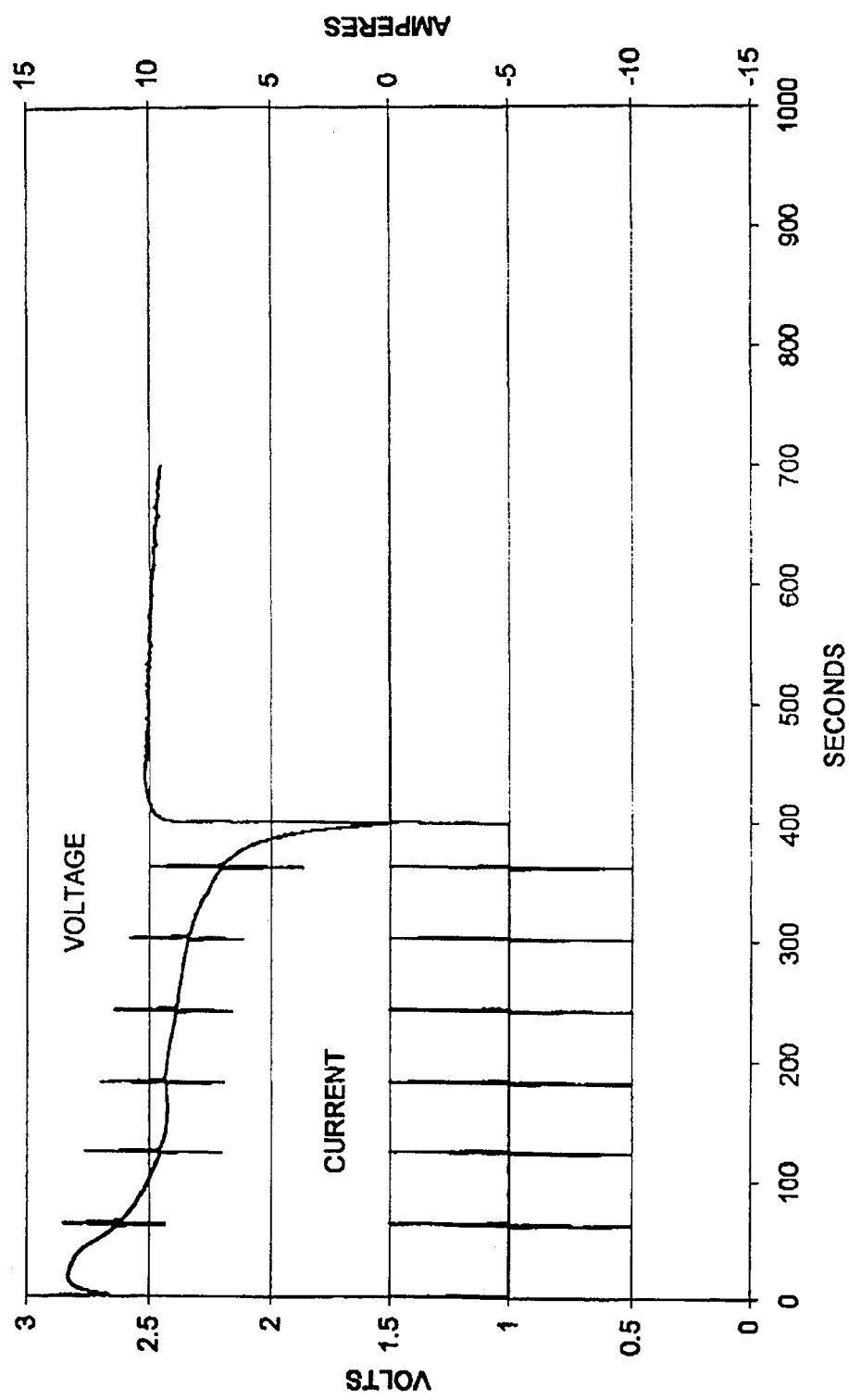
FIG. 4 is a graph showing the characteristics of a LiAl/FLiNaK/$CuF_2$ cell with 10% salt in the LiAl anode.
Figure 5:
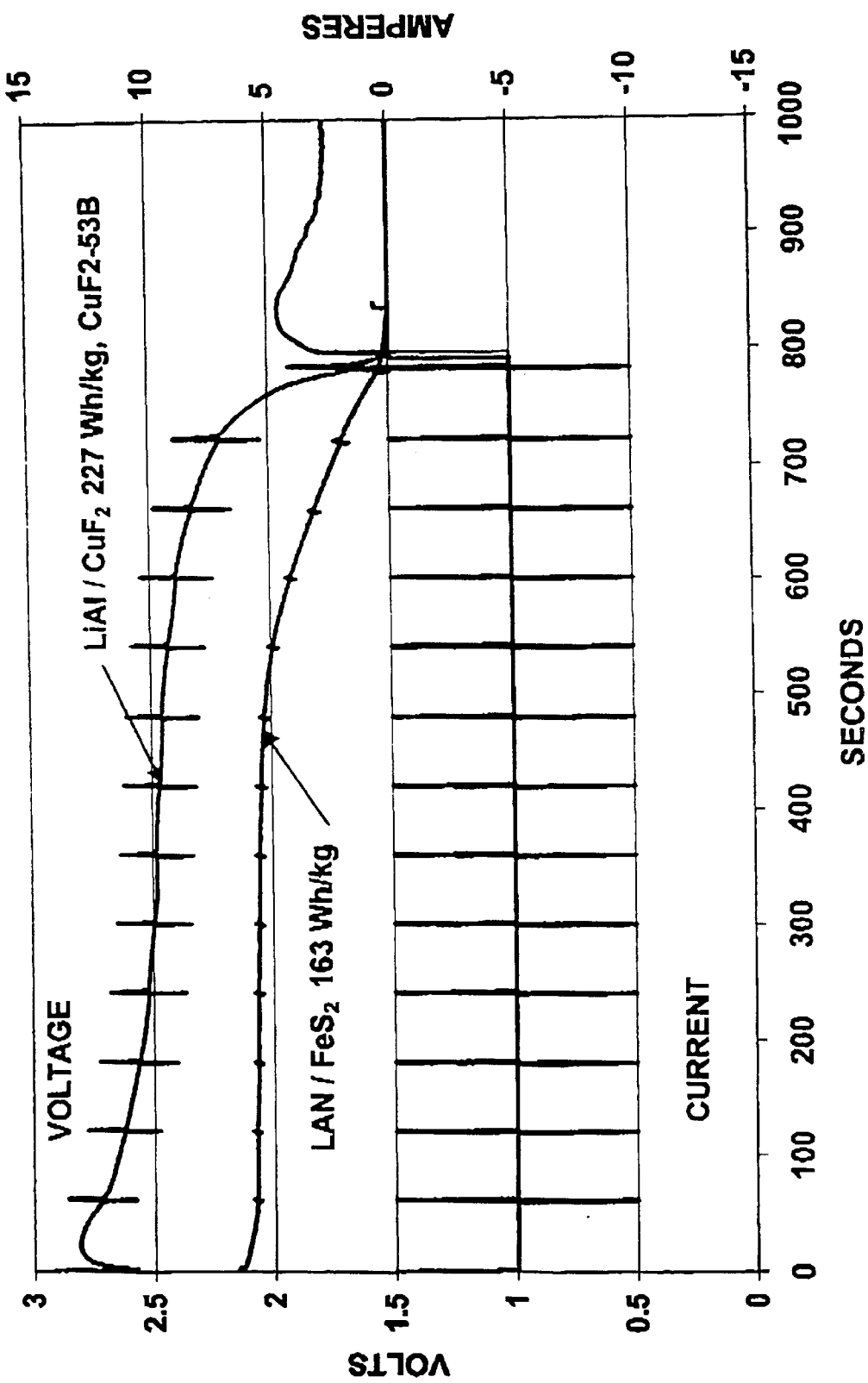
FIG. 5 is a graph showing the characteristics of a LiAl/FLiNaK/$CuF_2$ cell with 20% salt in the LiAl anode.

This phenomenon is also illustrated graphically in FIGS. 3–5, with FIG. 3 corresponding to 100% LAN (i.e., 70B above with no salt), FIG. 4 corresponding to 90 wt % LiAl and 10 wt % salt (i.e., 49A above), and FIG. 5 corresponding to 80 wt % LiAl and 20 wt % salt (i.e., 53B above).

Thus, it can be seen that a LiAl with a salt additive of 10 wt % to 40 wt % results in a thermal battery having improved characteristics.

Having described the invention with particular reference to the preferred embodiments, it will be obvious to those skilled in the art to which the invention pertains after understanding the invention, that various modifications and changes may be made therein without departing from the spirit and scope of the invention as defined by the claims appended hereto.

What is claimed is:

1. An electrochemical cell, comprising:

an anode of an alloy of lithium and salt in the range of 10 wt % to 40 wt % salt;

an electrolyte comprising an all fluoride molten salt; and a cathode comprising a transition metal fluoride.

2. The electrochemical cell of claim 1, wherein said anode includes LiAl.

3. The electrochemical cell of claim 2, wherein said salt is in the range of 20 wt % to 30 wt %.

4. he electrochemical cell of claim 3, wherein said cathode includes $CuF_2$.

5. The electrochemical cell of claim 1, wherein said electrolyte is selected from a group consisting of LiF—KF, LiF—KF—NaF, LiF—RbF, LiF—KF—RbF, LiF—NaF—RbF, and LiF—KF—RbF.

6. The electrochemical cell of claim 2, wherein said electrolyte is selected from a group consisting of LiF—KF, LiF—KF—NaF, LiF—RbF, LiF—KF—RbF, LiF—NaF—RbF, and LiF—KF—RbF.

7. The electrochemical cell of claim 3, wherein said electrolyte is selected from a group consisting of LiF—KF, LiF—KF—NaF, LiF—RbF, LiF—KF—RbF, LiF—NaF—RbF, and LiF—KF—RbF.

8. The electrochemical cell of claim 1, wherein said electrolyte is a LiF electrolyte.

* * * * *